US012749371B2

(12) United States Patent
Zhuang et al.

(10) Patent No.: US 12,749,371 B2
(45) Date of Patent: Sep. 29, 2026

(54) AUTOMATED COMPUTER GAME APPLICATION CLASSIFICATION BASED ON A MIXED EFFECTS MODEL

(71) Applicant: Aviagames, Inc., San Mateo, CA (US)

(72) Inventors: Genghong Zhuang, Beijing (CN); Yexu Lin, Guangzhou (CN); Zhigen Zhao, Philadelphia, PA (US)

(73) Assignee: Aviagames, Inc., San Mateo, CA (US)

( * ) Notice: Subject to any disclaimer, the term of this patent is extended or adjusted under 35 U.S.C. 154(b) by 173 days.

(21) Appl. No.: 18/847,382

(22) PCT Filed: Mar. 15, 2023

(86) PCT No.: PCT/US2023/064474
§ 371 (c)(1),
(2) Date: Sep. 16, 2024

(87) PCT Pub. No.: WO2023/178205
PCT Pub. Date: Sep. 21, 2023

(65) Prior Publication Data

US 2025/0201061 A1 Jun. 19, 2025

Related U.S. Application Data

(60) Provisional application No. 63/269,466, filed on Mar. 16, 2022.

(51) Int. Cl.
*G07F 17/32* (2006.01)

(52) U.S. Cl.
CPC ...... *G07F 17/3237* (2013.01); *G07F 17/3267* (2013.01)

(58) Field of Classification Search
CPC .. G07F 17/3237; G07F 17/3267; A63F 13/35; A63F 13/67; A63F 13/798; G06F 16/906; G06N 7/01
See application file for complete search history.

(56) References Cited

U.S. PATENT DOCUMENTS 8,882,576 B1 * 11/2014 Paradise ................. A63F 13/35 463/16
2014/0323204 A1 10/2014 Paradise et al.
(Continued)

FOREIGN PATENT DOCUMENTS

CA 109284774 † 1/2019
CN 104657747 A 5/2015
(Continued)

OTHER PUBLICATIONS

Cloud et al., "Variance decompositions for extensive-form games", arxiv.org, Cornell University Library, 201 OLIN Library Cornell University Ithaca, NY 14853, Sep. 8, 2020 (13 pages).
(Continued)

*Primary Examiner* — Oschta I Montoya
(74) *Attorney, Agent, or Firm* — Klarquist Sparkman, LLP

(57) ABSTRACT

Methods, systems, and devices for providing game classification are disclosed. In particular, example embodiments provide game classification with respect to a degree of chance or skill that influences game outcomes, for example with chance-based games and skill-based games. In an example method, a threshold training dataset is obtained to train a classification model to classify a given game as one of multiple game types that describe different degrees of chance or skill involved in the given game. From the threshold raining dataset, outcome factor distributions of games are determined and used to set trained thresholds of the classification model. The classification model can then be deployed in a computer service platform that receives queries from client devices.

24 Claims, 9 Drawing Sheets

(56) References Cited

U.S. PATENT DOCUMENTS

| | | | | |
|---|---|---|---|---|
| 2019/0102998 | A1 * | 4/2019 | Hirai | G07F 17/3267 |
| 2020/0269136 | A1 * | 8/2020 | Gurumurthy | G06N 3/09 |
| 2020/0302744 | A1 * | 9/2020 | Lutnick | G07F 17/32 |
| 2021/0374098 | A1 * | 12/2021 | Holmdahl | A63F 13/323 |

FOREIGN PATENT DOCUMENTS

| | | | |
|---|---|---|---|
| CN | 107569848 | B | 8/2020 |
| CN | 108228845 | B | 10/2020 |
| CN | 113853243 | A | 12/2021 |
| WO | WO 2018/196561 | A1 | 11/2018 |

OTHER PUBLICATIONS

Duersch et al., "Measuring skill and chance in games", European Economic Review, North-Holland, Amsterdam, NL, vol. 127, May 19, 2020 (18 pages).

Extended European Search Report mailed Feb. 5, 2026, for EP23771651.9 (8 pages).

International Search Report and Written Opinion for PCT/US2023/064474, mailed Jul. 12, 2023, 15 pages.

* cited by examiner
† cited by third party

402

404 406 408 410 402

| user_id | score | seed | created_at | dataset |
|---|---|---|---|---|
| 1541120 | 10196 | E88D7B0FE69E1C72 | 2021-08-01 02:30:56 | 1 |
| 1541120 | 12012 | 18ED862E4E1232D0 | 2021-08-01 02:33:04 | 1 |
| 1541120 | 29769 | CC203ED87E6F9926 | 2021-08-01 02:35:31 | 1 |
| 1541120 | 29769 | CC203ED87E6F9926 | 2021-08-01 02:35:32 | 1 |
| 1541120 | 31606 | 892B1406CC3EDF6C | 2021-08-01 02:38:32 | 1 |
| 1541120 | 10105 | C8F99CA6619AED65 | 2021-08-01 02:41:18 | 1 |
| 1541120 | 25354 | 9C7098818C7FE00F | 2021-08-01 02:44:15 | 1 |
| 1541120 | 29397 | 521936D898D2CB29 | 2021-08-01 02:47:47 | 1 |
| 1541120 | 16463 | 9BF8B19867E451E6 | 2021-08-01 02:49:53 | 1 |
| 1541120 | 21337 | 6362541F6D22F38F | 2021-08-01 02:51:58 | 1 |
| 3512576 | 34812 | 9C145EC14BA1B960 | 2021-08-01 08:10:29 | 1 |
| 3512576 | 59518 | CB04265A9F29C218 | 2021-08-01 08:12:54 | 1 |

*FIG. 4*

AUTOMATED COMPUTER GAME APPLICATION CLASSIFICATION BASED ON A MIXED EFFECTS MODEL

PRIORITY CLAIMS AND RELATED PATENT APPLICATIONS

This application is the National Stage of International Application No. PCT/US2023/064474, filed Mar. 15, 2023, which claims the benefit of U.S. Provisional Application No. 63/269,466, entitled "GAME CLASSIFICATION AND APPLICATION BASED ON A MIXED EFFECTS MODEL," filed on Mar. 16, 2022. The entire disclosure of the aforementioned applications are hereby incorporated by reference as part of the disclosure of this application.

TECHNICAL FIELD

This disclosure relates to techniques for automated classification of computer game applications based on a degree of skill factors versus chance factors in the computer game applications.

BACKGROUND

The nature of a computer game application dictates how much of a role a player's input can have on the outcome of the game. The degree of skill-versus-chance in a computer game application—whether a game is skilled-based, chance-based, or some combination between the two—can bring real-world technical challenges for a computerized, networked environment that hosts the game(s) because said degree can change the implementation on game provisioning (e.g., rules and configurations for a game), cheating detection, among others. Due to the complex nature of modern computer games and how widely different every game can be, there is not any direct, easy, and standard way to perform comparison and analysis of game outcomes with game inputs for determining a given computer game application's skill-versus-chance nature.

It therefore remains desirable to have techniques that can automatically determine, given a computer game application, a degree of skill factor versus chance factor in the computer game application and automatically classify the computer game application based on the degree that is determined.

BRIEF DESCRIPTION OF THE DRAWINGS

FIG. 4 illustrates an example outcome dataset of a game that can be used to classify a skill-versus-chance nature of a computer game application.

Figure 1:
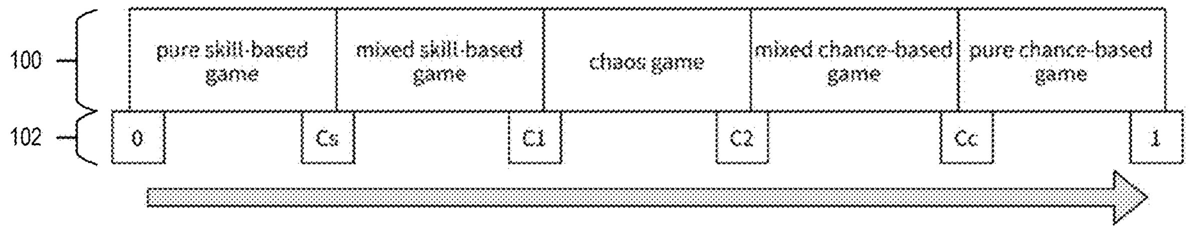
FIG. 1 is an example schematic diagram of game classification.

The techniques described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, disclosed embodiments are amenable to various modifications.

DETAILED DESCRIPTION

Embodiments of the present disclosure relate to game classification. Example embodiments provide a server-based implementation of a common classification standard for game types and provides a technical method for game classification. Game classification according to disclosed embodiments specifically relates to or is based on mixed effects model representations of games. It can be used in scenarios when there is a need in a computerized environment for a computer system to determine a game type based on the level of skills and chances of the game with little to no human intervention and a need for little to no human-to-human bias Accordingly, the present disclosure provides technical solutions that are applied in useful applications and settings. Traditionally, human beings may attempt to use their intuition to determine whether certain games' outcome resorts to only chances, such as coin flipping or dice rolling. This is highly unreliable, subjective, and usually can be applicable when such games have simple rules, where it is difficult to change the game results by improving skills during regular game playing based on common experience. On the other hand, traditionally there are certain games considered to only contain skill factors, such as chess. However, more games simultaneously involve both chance factors and skill factors, which require a more definite approach for classification.

Game rules have been used for assessment and determination of a game type. However, many games are complex systems, which generate large probability spaces by simple rules. Therefore, it may be difficult to perceive the whole picture of a game simply by deducing from the rules of the game. Backgammon is an example of a game that is difficult to consistently and accurate characterize solely based on intuition and deductions from game rules. Backgammon involves the use of dice in the rules of the game. Dice use introduces an element of chance into a game, as different actions can result from random dice roll outcomes. When determining whether backgammon is a game of chance, however, a result of the game does not primarily depend on the dice rolling in backgammon, but rather on selections and actions made by players on both sides based on the results of the dice rolling. As a result, the outcome of a game of backgammon can be more affected by players' skills instead of the random results of the dice rolling. Therefore, backgammon may be considered by some as a game of skill. However, although some may consider backgammon to be a game of skill, others may lean on the dice aspect of backgammon to consider backgammon as a game of chance.

It is not intuitive to determine a game type from the game rules only, which is difficult to analyze quantitatively. Thus, provided in this disclosure are techniques for automatic determination of a game type based on statistical analysis of a large amount of game data. Technical solutions described herein are applied to provide and act on useful information with respect to implementation and operation of computer game applications. In certain scenarios, especially when it concerns verifying the business scope of an enterprise to ensure compliance, various parties such as clients, enterprises, channel platforms, and supervision organizations are provided with game classification information that is needed to clearly understand the nature of the services provided by the enterprise. Technical solutions described herein are applied to control location/region-based implementation of computer game applications, cheating detection in computer game applications, and more.

I. Overview of Game Classification and Game Types

Classification of Game Types

Games can have different degrees of chance factors versus skill factors, and these varying degrees can correspond to a plurality of pre-defined game types. In some embodiments, games can be classified to five types based on the amount of chance factors and skill factors of the game: pure chance-based game (PC); pure skill-based game (PS); mixed chance-based game (MC); mixed skill-based game (MS); and chaos game (CG). In such example embodiments, a pure or absolute chance-based game has outcomes that are determined by pure chance and lack a skill factor. For example, dice rolling, coin flipping, or slot machines can be considered as pure chance-based games. A pure skill-based game has outcomes that are determined by pure skill and lack a chance factor; example pure or absolute skill-based games include chess, go, basketball, and others. Mixed chance-based games, mixed skill-based games, and chaos games represent games that have some mixed degree of chance factors and skill factors influencing their outcomes; that is, such games are not pure chance-based nor pure skill-based. In some examples, poker can be considered as one of a mixed chance-based game, mixed skill-based game, or a chaos game, because both player skill and chances/probabilities of certain cards being in play influence player outcomes in poker.

While mixed chance-based games, mixed skill-based games, and chaos games represent intermediate degrees of chance factors and skill factors between pure chance-based and pure skill-based, it would be difficult for human beings to rely upon their intuition to exactly quantify the intermediate degrees of chance factors and skill factors of a given game to be able to classify the given game into one of these intermediate types. Returning to the example of poker, one may abstractly understand that player outcomes in poker vary according to both player skill and chance, but the exact quantification of said variance cannot be easily or feasibly obtained by one's intuition. Moreover, different perspectives on the contributing weights of skill and chance for a game (e.g., poker) can vary between people, leading to inconsistent characterization of the game.

Embodiments of the present disclosure addresses at least these technical challenges. While description herein is provided with reference to the five game types discussed above, it will be understood that some implementations can vary in a number of game types that games are classified into and/or with respect to which game types into which games can be classified. For example, one implementation of the present disclosure only classifies pure chance-based, pure skill-based, or mixed. As another example, an implementation of the present disclosure classifies games with respect to ten game types, with more than three intermediate game types between pure chance-based and pure skill-based. In some embodiments, a set of game types considered by an implementation of the present disclosure corresponds to operation constraints of a given location or region.

Parameter Selections for the Game Classification Model

Multiple game types are defined based on boundary or threshold parameters. With respect to five game types, four different parameters between the boundaries of 0 and 1 can be used to classify a given game. For example, the magnitudes of the four parameters are:

$$0 < C_s < C_1 < C_2 < C_c < 1.$$

FIG. 1 is a schematic diagram of game classification, and FIG. 1 demonstrates a plurality of game types 100 being defined by a plurality of threshold parameters 102. In the illustrated embodiment, the threshold parameters 102 include 0, $C_s$, $C_1$, $C_2$, $C_c$, and 1. The threshold parameters 102 are defined with respect to factors determined by a classification model for given games. A given factor determined for a given game is compared to the threshold parameters 102 to classify the given game into one of the game types 100. Therefore, a quick and standardized determination/classification of game type for a game can be obtained.

$C_c$: Evaluation parameter for pure chance-based games, theoretically closer to 1.

$C_1$: Evaluation parameter for mixed skill-based games.

$C_2$: Evaluation parameter for mixed chance-based games.

$C_s$: Evaluation parameter for pure skill-based games, theoretically closer to 0.

Description regarding determining the values of threshold parameters 102 follows later in this document.

II. Example Embodiments of Mixed Effect Models

According to embodiments of the present disclosure, the nature or dynamics of a computer game application are modeled or represented using a mixed effects model. In particular, a mixed effects model is generated for a game to represent and capture dependencies and relationships of game outcomes on players, game seeds, and other game aspects. Based on creating a mixed effects model of a game, random chance effects and variances between player-specific outcomes for the game can be determined and used to classify a game type for the game.

In some embodiments, the mixed effects model for a game is a common fitting model that is provided to simulate player scores or outcomes for the game. Based on the model, the outcome factor of a game, or the degree of chance versus skill that affects the outcomes of the game, can be reflected by model values or parameters that can be calculated by statistical principles.

For a given game, Y is a response variable representing a score of a game. There are many covariates $X_i$ related to this game as well, including but not limited to age(s) of the player(s), gender(s) of the player(s), time the player(s) has (have) played, difficulty of the game, a seed used in the game (note: a seed represents a different round of the same game; for example, different seeds in a solitaire game represent different initial card layouts), and/or the like.

The mixed effects model is constructed to describe the relationship between Y and all covariates $X_i$ (i=1, 2, . . . , p). The following description provides a general model that can be constructed to provide a statistical scheme to measure outcome factors of a game.

An example mixed effects model is defined below in Equation 1.

$$Y = P\gamma + X\beta + Z\mu + \in \quad (1)$$

In Equation 1, P represents the players, X represents a fixed effects design matrix, and Z represents a random effects design matrix. In the example mixed effects model, P can be regarded as a random effect, and P encodes important information used to reflect the outcome factor of the game, which can capture differences between players. ∈ is a random error for a mean of 0 and a variance of $$\sigma_\epsilon^2.$$

β is an unknown but fixed value. γ is a random effect and follows a Gaussian distribution with a mean of 0 and a variance of $$\sigma_P^2.$$

μ is also a random effect and follows a Gaussian distribution with a mean of 0 and a variance of $$\sigma_R^2.$$

An evaluation method to measure the outcome factor of the game is provided in Equation 2. As shown in Equation 2, the outcome factor is measured based on components of the mixed effects model of the game, and in particular, based on the parts of the model that are highly related to the game skills (player-attributed differences in outcomes, or differences/variance between players) and the random error.

$$\kappa = \frac{\sigma_P^2}{\sigma_P^2 + \sigma_\in^2} \quad (2)$$

The value of the outcome factor according to Equation 2 is between 0 and 1 due to the formula property. The outcome factor is configured (e.g., according to Equation 2) such that the outcome factor k is closer to 1 when a game is more a pure skill-based game, due to player variance $$\sigma_P^2$$

being much larger than random error variance $$\sigma_\epsilon^2.$$

That is, differences in players themselves (e.g., with respect to skill) contribute significantly to differences in game outcome, at least compared to random error. The outcome factor is also configured (e.g., according to Equation 2) such that the outcome factor k is closer to 0 when a game is more of a pure chance-based game, due to player variance $$\sigma_P^2$$

being much smaller than random error variance $$\sigma_\epsilon^2.$$

In some embodiments, variance values $$(\sigma_P^2, \sigma_R^2, \text{ and } \sigma_\epsilon^2)$$

are obtained and determined/estimated using maximum likelihood estimation (MLE). With respect to Equation 1, the variance of Y can be expressed as in Equation 3 below:

$$\sigma_Y^2 = \sigma_\in^2 I + \sigma_P^2 PP^T + \sigma_R^2 ZDZ^2 \quad (3)$$

The likelihood function is equivalent to Equation 4:

$$l(\sigma_P^2, \sigma_R^2, \sigma_\epsilon^2) = -\frac{1}{2}\{\log(\sigma_Y^2) + (Y - X\tilde{\beta})^T(\sigma_Y^2)^{-1}(Y - X\tilde{\beta})\} \quad (4)$$

wherein:

$$\tilde{\beta} = (X^T(\sigma_Y^2)^{-1}X)^{-1}X^T(\sigma_Y^2)^{-1}Y$$

Then, the likelihood function is maximized to obtain the values of $$\sigma_P^2$$

and $$\sigma_\epsilon^2$$

which are used to calculate the outcome factor k (e.g., according to Equation 2).

Thus, example embodiments include a mixed effects model that is representative of a game and includes a player component (e.g., Equation 1), and at least the player component and random error component of the mixed effects model are used to determine the outcome factor (e.g., Equation 2). In some examples, the outcome factor is determined further based on MLE. In some embodiments, fixed effects X and random effects Z in the model are determined according to different characteristics of a specified game. Using bingo as an example of a game, game characteristics that can be included in the fixed effects X and random effects Z in the model include the total number of bingo balls selected in one round, a time interval between bingo ball announcement/broadcast, the number and types of props generated, and/or the like.

The following description illustrates use of a mixed effects model with respect to a specific example game. In a round of the specific game, a process of the game is randomly generated according to one seed, and the score of the player who plays the game will be highly dependent on the difficulty of the seed. In some embodiments, the seed encodes a different deterministic in-game setup or environment. For example, a seed can be an order of cards in a deck (e.g., for a solitaire game, for a poker game, for a card game). As another example, a seed indicates the numbers and arrangement thereof of a bingo card. The influencing factor of the seed is considered as a random effect, with the assumption that there are m players, n seeds, and the score of the i-th game is $Y_i$, and assuming the model is as below in Equation 5:

$$Y_i = \beta_0 + \sum_{0<j<m} P_i(j)\gamma_j + \sum_{0<l<n} S_i(l)\mu_l + \epsilon_i \tag{5}$$

In the example model of Equation 5, $P_i(j)$ is an indicator function. For the i-th game, the value of $P_i(j)$ is 1 if the game is played by the j-th player, otherwise it is 0. $S_i(l)$ is also an indicator function. The value of $S_i(l)$ is 1 if the i-th game uses the l-th seed, otherwise it is 0. In this illustrative example, it is assumed that $$\gamma_j \sim (0, \sigma_P^2),\ \mu_l \sim (0, \sigma_R^2),\ \epsilon \sim (0, \sigma_\epsilon^2).$$

Another example approach to describe the model is to use multiple subindexes, as demonstrated in Equation 6 below. In the example model of Equation 6, $Y_{ijk}$ represents the k-th game of the j-th seed of the i-th player, then $$Y_{ijk} = \beta_0 + \gamma_i + \mu_j + \epsilon_{ijk} \tag{6}$$

As discussed above, maximum likelihood estimation can be used to estimate $$\sigma_P^2,\ \sigma_R^2, \text{ and } \sigma_\epsilon^2.$$

For example, MLE is performed to determine the variance values for outcome factor determination from any of the models shown in Equation 1, 5, or 6.

III. Example Embodiments of Outcome Factor Determination Using a Mixed Effects Model As discussed above, outcome factors for a game are determined based on a mixed effects model representation of the game. In particular, an outcome factor for a game is determined (e.g., in Equation 2) based on player variances and random error variances which can be determined given game data (and using MLE), for example. In some embodiments, an outcome dataset for the game that includes the data for at least the outcome component (Y) and the player component (P) can be used to determine the variance values for the outcome factor of the game. Multiple outcome factors, or multiple samples of the outcome factor, of a game can be determined using multiple outcome datasets for the game, or using multiple samples of an outcome dataset of the game. In some embodiments, each outcome dataset needs to include m pieces of data for i number of players. For example, for each player, the outcome dataset includes at least game score, game time, in-game performance, and/or the like.

Figure 2:
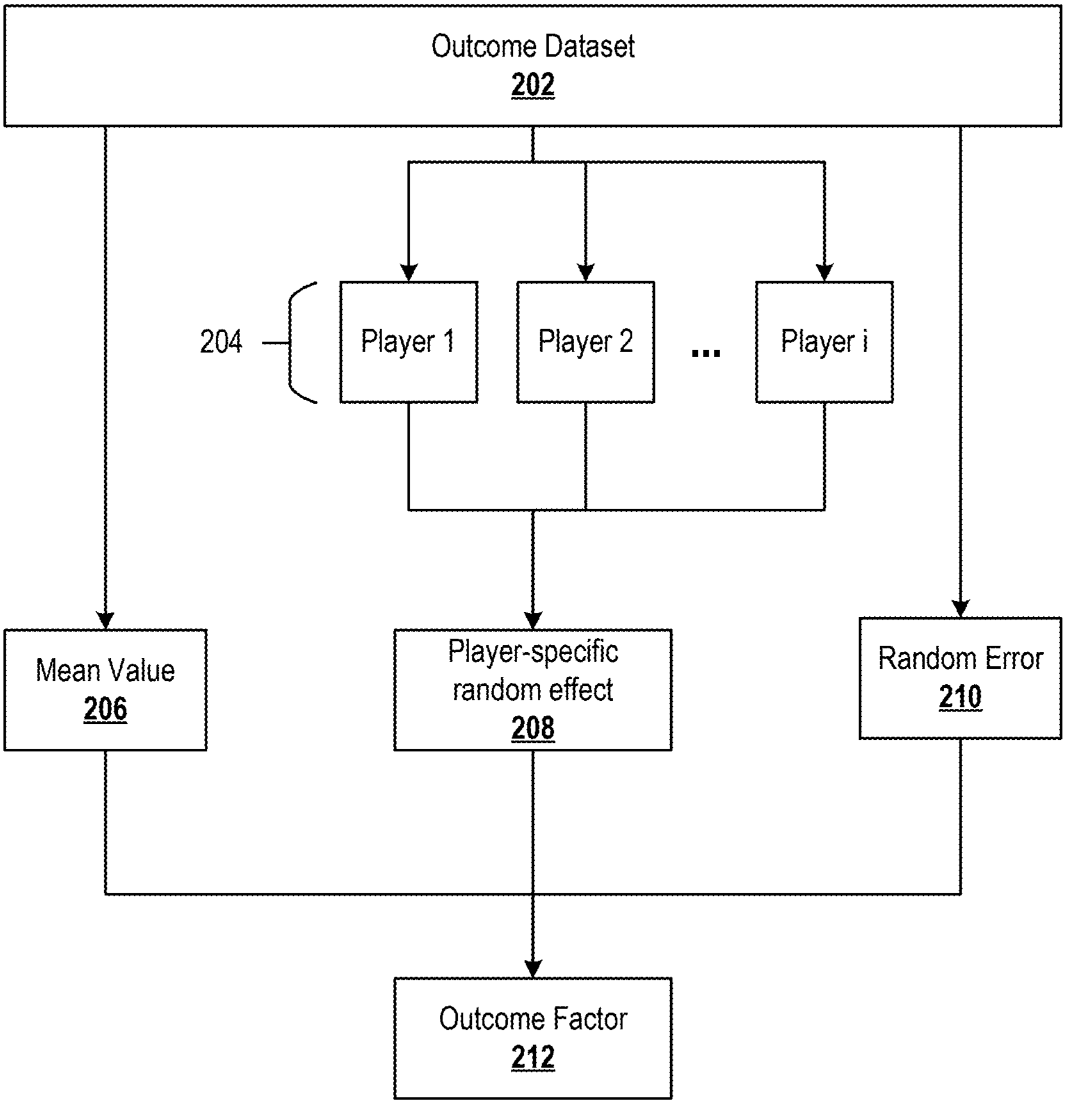
FIG. 2 is a block diagram illustrating an example process of determining an outcome factor for a computer game application.

FIG. 2 is a flow diagram illustrating the process of determining an outcome factor for a game. As illustrated, an outcome dataset 202 for a game is used to determine an outcome factor 212. As discussed above, the outcome factor 212 (e.g., K as defined by Equation 2) can be used for the classification of a game and weighs player variances with random error variances. The outcome dataset 202 includes outcomes of a game for different players 204. One or more mean values 206 are determined from the outcome dataset 202 so that the variance values used to determine the outcome factor 212 can be determined/estimated. The player-specific random effect 208 or component (e.g., P in Equation 1) and a random error 210 (e.g., E in Equation 1) are also determined from the outcome dataset 202 so that the outcome factor 212 can then be determined.

In some embodiments, an outcome factor 212 corresponds to an outcome dataset 202. In some embodiments, multiple outcome factors can be determined based on selecting different subsets or partitions within the outcome dataset 202 and using each subset or partition to determine a respective outcome factor. In some embodiments, at least a pre-determined number of outcome factors 212 are determined for a game, and higher numbers of outcome factors 212 for a game can lead to improved classification of the game.

With multiple outcome factors 212 (e.g., K), a distribution function of the outcome factors for a game can be determined. As will be described further below, particular quantiles of the distribution function of a game are used to classify the game.

IV. Example Schemes for Model Parameters

Particular quantiles of outcome factor distribution functions of games are used to establish and train the threshold parameters for game classification (e.g., threshold parameters 102 in FIG. 1), and the quantiles of an outcome factor distribution function of a given game is used to classify the given game with respect to the threshold parameters. The following describes an example configuration of the particular quantiles of outcome factor distribution functions.

For a given α, 0<α<1, select $$c_s = F_s^{-1}(\alpha),\ c_c = F_s^{-1}(1-\alpha) \tag{7}$$

$$F_s^{-1} \text{ and } F_s^{-1}$$

are the inverse function of the distribution function and are also quantile functions. If the distribution function of a random variable S is $$F_s^{-1}(\alpha),$$

the above selection guarantees Equation 8 below.

$$P(S < c_s) = \alpha \tag{8}$$

Similarly, if the distribution function of a random variable S is $F_c(\bullet)$, then:

$$P(S > c_c) = 1 - P(S > c_c) = 1 - (1 - \alpha) = \alpha \tag{9}$$

In other words: assume a given game is a pure skill-based game with an outcome factor of S and the distribution function of S is $F_s(\bullet)$. If $C_s$ is selected by the above formula, then its probability being determined as a non-pure skill-based game is α. Similarly, if a game is a pure chance-based game, then its probability being defined as a non-pure chance-based game is also α. Typically, α is set to 0.05 or 0.01.

Theoretically, these two distribution functions are difficult to be obtained, but can be estimated from data. A series of known pure chance-based games may be considered and their corresponding skill factors may be calculated. Then the 95% quantile of the series of numbers is used as $C_c$. Similarly, $C_s$ is set as 5% quantile calculated for a set of skill factors of known pure skill-based games. Thus, a training dataset can include distribution functions for games labelled as pure chance-based and pure skill-based, or include data from which the distribution functions can be determined). For intermediate threshold parameters (such as $C_1$ and $C_2$), a ratio can be pre-determined and pre-configured: what ratio of the chance factor a game contains allows the game to still be called a skill-based game.

V. Example Embodiments of Classification Model Training

Figure 3:
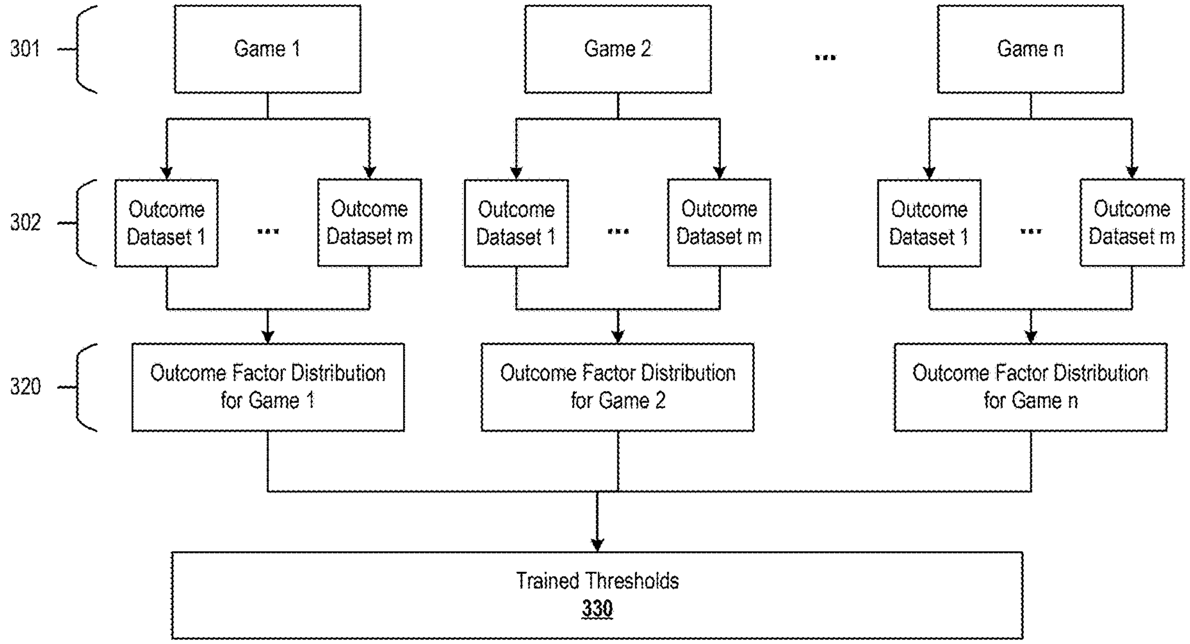
FIG. 3 is a block diagram illustrating an example training process for a game classification model.

FIG. 3 is a schematic diagram illustrating a parameter training process for pure skill-based games and pure chance-based games. In the illustrated example, multiple games 301 are used to determine one or more trained thresholds 330 used for game classification with a classification model. Each of the games 301 used in training the classification model are labelled (e.g., manually, automatically by another classification model) to indicate whether each game is a pure chance-based game or a pure skill-based game. The games 301 are either pure chance-based or pure skill-based in order to determine trained thresholds 330 that are used for classifying pure chance-based games and pure skill-based games. In some examples, the games 301 can be labelled as other game types, including various intermediate game types, to determine trained thresholds for classifying the other game types. In some embodiments, the games 301 are labelled according to game rules associated with each game. In some embodiments, complexity of game rules is used to label the games 301. For example, it would be easy to determine pure chance-based games that have simple rules and obviously lack skill factor, such as dice rolling, coin flipping, or slot machine. Pure skill-based games may also be determined by rules. For example, games such as finger-tip basketball, chess, and go can be classified as pure skill-based games.

Each game 301 is accompanied with one or more outcome datasets 302. As many results, scores, and data are obtained for games that can be clearly classified as possible and stored as the outcome datasets 302. In some embodiments, the outcome datasets 302 are generated based on executing or performing simulations of the game 301 with different players, different seeds, and/or the like. An outcome factor (e.g., K according to Equation 2) is determined for each outcome dataset 302 of a game 301, as discussed above with FIG. 2. Thus, with multiple outcome datasets 302, an outcome factor distribution 320 can be determined for each game 301.

FIG. 4 shows an example outcome dataset for a game, as described below. In some embodiments, the multiple outcome datasets for a game correspond to simulation runs of the game. For example, data obtained from a first simulation run is included in a first outcome dataset and data obtained from a second simulation run is included in a second outcome dataset. In some embodiments, an outcome dataset corresponds to a particular player. In some embodiments, an outcome dataset corresponds to a particular game seed. In some embodiments, game data is obtained and arbitrarily divided into multiple outcome datasets. In some embodiments, multiple outcome datasets are generated from obtained game data, and the outcome datasets may overlap. For example, a first plurality of outcome datasets are divided according to player and a second plurality of outcome datasets are divided by game seed (thus, simulated game data for a particular player with a particular game seed can appear in a dataset of the first plurality and a dataset of the second plurality).

The trained thresholds 330 are then determined from the outcome factor distributions 320 of the games 301, and in particular, particular quantiles of said distributions. If the game is a pure skill-based game, the 95% quantile of the distribution function is calculated; if the game is a pure chance-based game, the 5% quantile of the distribution function is calculated. When the number of each type of games is large enough, the corresponding model parameters can be obtained by averaging the $\hat{K}$ distributions of the corresponding types of games. For example, The respective 95% quantiles from pure skill-based games can be averaged to determine a first trained threshold, and the respective 5% quantiles of pure chance-based games can be averaged to determine a second trained threshold.

In some embodiments, the 95% quantile and the 5% quantile are calculated (respectively according to the game) based on a pre-defined significance parameter (e.g., alpha) being set to 0.05 (see Section IV above). In another example in which alpha is set to 0.01, then the 99% quantile is calculated for a pure skill-based game, and the 1% quantile is calculated for a pure chance-based game. In some embodiments, the significance parameter (e.g., alpha) is pre-defined and/or configurable. In some embodiments, a system can generate a plurality of models each corresponding to a different significance parameter. For example, a classification system includes a first model having threshold parameters determined based on a significance parameter of 0.05 and a second model having threshold parameters determined based on a significance parameter of 0.01. While examples of significance parameters described herein include 0.05 and 0.01, it will be understood that other example values can include 0.005, 0.02, 0.03, 0.04, 0.05, 0.1, and/or other example alpha values used in the field.

Determination of different thresholds from different sets of games improves classification accuracy provided by an example classification system that implements the disclosed techniques. That is, choosing different quantiles of two types of games to determine two thresholds provides greater accuracy than choosing the different quantiles from one type of game or one set of games.

VI. An Illustrative Example of Game Classification Based on a Mixed Effects Model In this example, real data from a bingo game was used to demonstrate game type classification according to embodiments of the present disclosure.

The game was a number bingo game, the basic rules of which were similar to those of the popular bingo game in the United States, but with a few unique rules added. Players were provided with a 5*5 number board with a total of 24 numbers except for the center position. A limited time was set for each game, and one number from 1-75 numbers was randomly selected and broadcasted every 3 seconds. Players looked for the number on the number board and quickly marked it when found. Points were awarded according to the number of numbers finally marked by the player and the number of bingo. During the game, players could obtain several props with special effects through an energy mechanism to assist players to perform better performance.

A few chance factors were included at the level of the game rules: the number boards were randomly generated; the numbers broadcasted each round were randomly drawn within a certain range; the acquisition of props also had a certain randomness. However, in the real games, the player's skill elements played a significant role: the speed of finding the number on the number board after broadcast of the number; the speed of marking the number after finding the broadcasted number. The difference between the number boards and the broadcasted numbers could impact a player's final performance. But overall, the skill level of each player still had a statistically greater impact.

FIG. 4 shows an outcome dataset 402 of the example bingo game. The outcome dataset 402 includes unique player identifiers 404 ("user_id"), scores 406 or outcomes for each player and used to evaluate the corresponding player's performance, seed 408, timestamp 410, and dataset identifier. In the illustrated example, the same user_id referred to the same player. Each player played multiple rounds of the game to provide multiple pieces of data. The score 406 of each entry was the score of the round of the game, which was used to evaluate the player's performance. The seed 408 indicated the difference among the number boards used by the players in this round and the order of the numbers broadcasted, which had a certain impact on the final game result but little impact on the players' performance. The dataset identifier is a serial number of the data set, indicating with which other data this piece of data would form an outcome dataset to calculate K value of the outcome factor. For example, the dataset identifier for each entry in this illustrated example is 1, indicating that the entries belong together to form the one outcome dataset 402.

The K distribution of the bingo game was obtained according to the outcome factor values of multiple outcome datasets, including the one illustrated in FIG. 4. The 95% quantile of K distribution function of the bingo game was determined to be 0.1821.

Assume that the threshold parameters obtained during the parameter training process were as follows: $C_s$=0.1242, $C_c$=0.9511, and other threshold parameters are preset or pre-determined: $C_1$=0.35, $C_2$=0.38. As such, the game type of this bingo game was determined to be a mixed skill-based game, due to the 95% quantile of the outcome factor distribution of the bingo game being between $C_s$ and $C_1$, thus corresponding to the mixed skill-based game type according to FIG. 1.

In this example, the 95% quantile of K distribution function of the bingo game (determined to be 0.1821) was compared to the threshold parameters of the classification model. This generally suggests a 95% confidence that the bingo game can be classified as a mixed skill-based game type. In other examples, other quantiles of the K distribution function of the bingo game (or another specific game to be classified) are obtained and compared to the threshold parameters, depending on a confidence parameter. In one example, the 99% quantile of K distribution function of the bingo game is compared to the threshold parameters. In another example, the 90% quantile of K distribution function of the bingo game is compared to the threshold parameters.

VII. Example Implementations and Applications of Game Classification

Figure 5:
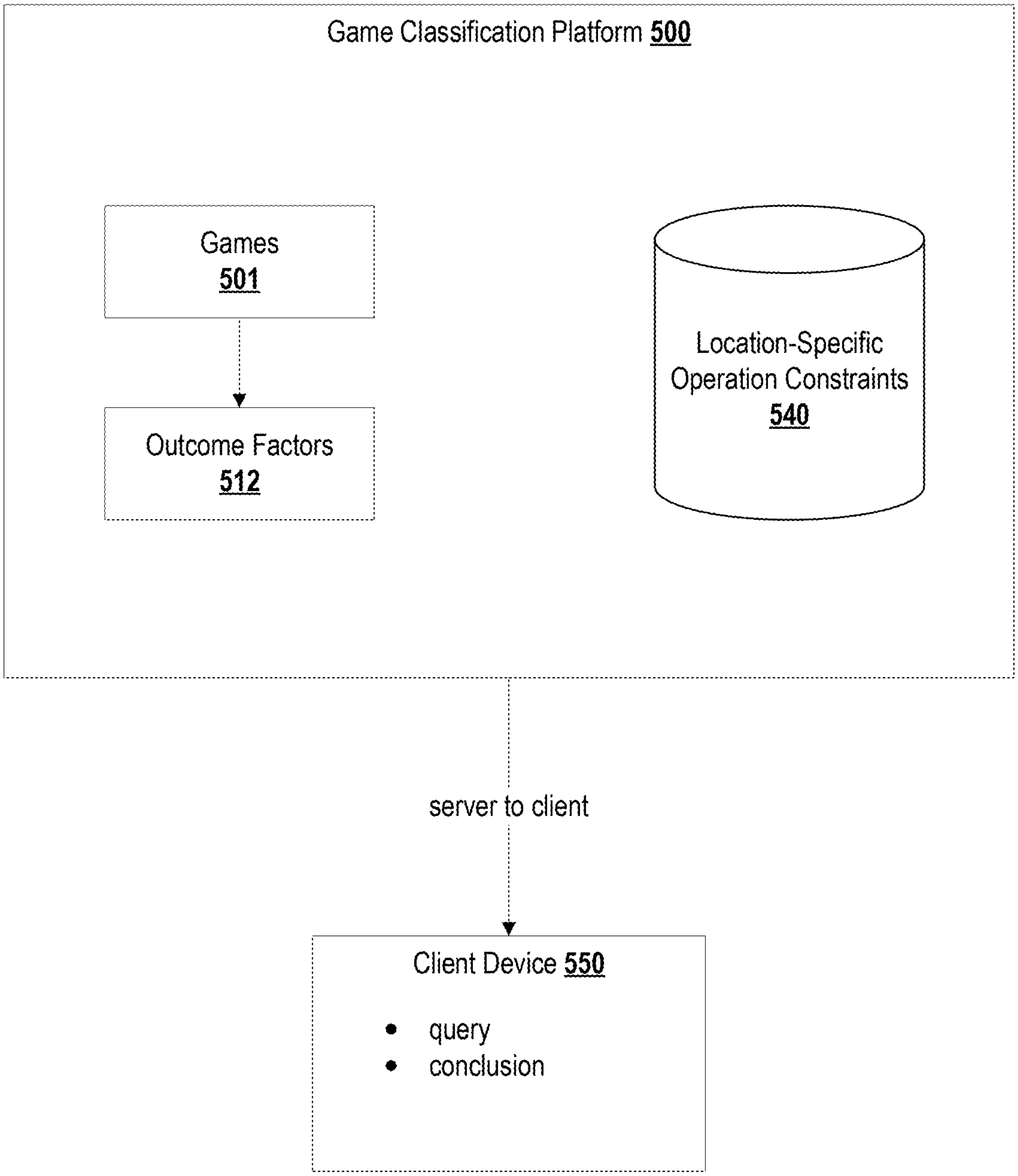
FIG. 5 is a block diagram illustrating an example game classification platform that provides game classification and other functionality as a service for client devices.

Disclosed embodiments providing game classification can include various implementations. FIG. 5 illustrates an example server-client implementation in which a game classification platform 500 implements disclosed techniques for game classification to provide game classification information to client devices 550. In some embodiments, the game classification platform 500 is further configured to assist determination of compliance of games in specific regions according to the game types of the games.

A. Overview of the Platform

An example game classification platform 500 implements the algorithms and techniques disclosed herein (e.g., as application programs, or computer executable code/instructions) to facilitate quick determinations of whether a game is a skill-based game. The game classification platform 500 may be configured to provide a binary output indicative of whether a game is a pure skill-based game, or an output indicative of a classified game type of the game, with the classified game type being one of a plurality of game types that includes pure skill-based game type. In some embodiments, the game classification platform 500 further automatically outputs a conclusion in view of requirements in different countries and regions for real-money competitive games: whether the game can be operated as a real-money competitive game in that region.

B. Example Logic of the Platform

According to an example embodiment, the game classification platform 500 first transfers game data 501 and location-specific operation constraints 540 (e.g., regional regulation data) to a server for storage in a fixed format. The game data 501 can include the computer game application itself, which can be executed to simulate outcomes for a game. The game data 501 can include outcome datasets for the game that were recorded during real play of the game. For example, the game classification platform 500 includes or is in communication with a gaming platform via which users/players can play one or more games, and the game classification platform 500 obtains game data from the gaming platform. The game classification platform 500 then calculates outcome factors 512 from the game data 501 according to techniques disclosed herein, and the game classification platform 500 generates a game classification model for easy query. For example, the game classification model includes a table of threshold parameters based on the outcome factors 512. Finally, the game classification platform 500 provides a client user interface on the client device 550 via which query entries can be defined and responses to query entries can be provided.

In some embodiments, the game classification platform 500 obtains the game classification model, and the game classification model is pre-trained. In some embodiments, the game classification platform 500 includes or is in communication with a backend system that implements the game classification model. In some embodiments, the game classification platform 500 uses the game classification model to predetermine game types for a library of games prior to a query being received, and the game classification platform 500 returns a predetermined game type in response to receiving a query. In some embodiments, the game classification platform 500 is configured to retrain and reconfigure the game classification model based on subsequent game data being obtained and/or based on game type labels being provided to the game classification platform 500. For example, the game classification platform 500 receives an indication that a particular game is labelled as a particular game type, and the game classification platform 500 retrained or reconfigures the game classification model based on the indication. The indication may be received from the client device 550, for example, by a user that disagrees with a game type provided by the game classification platform 500.

In some embodiments, the game classification platform 500 includes the location-specific operation constraints 540 with responses to queries received from the client device 550. The current legal regulations for real-money competitive games are very different in different countries and regions, and the regulations change greatly. Therefore, the game classification platform 500 may periodically update the location-specific operation constraints 540.

C. Description of a Client User Interface

Figure 6:
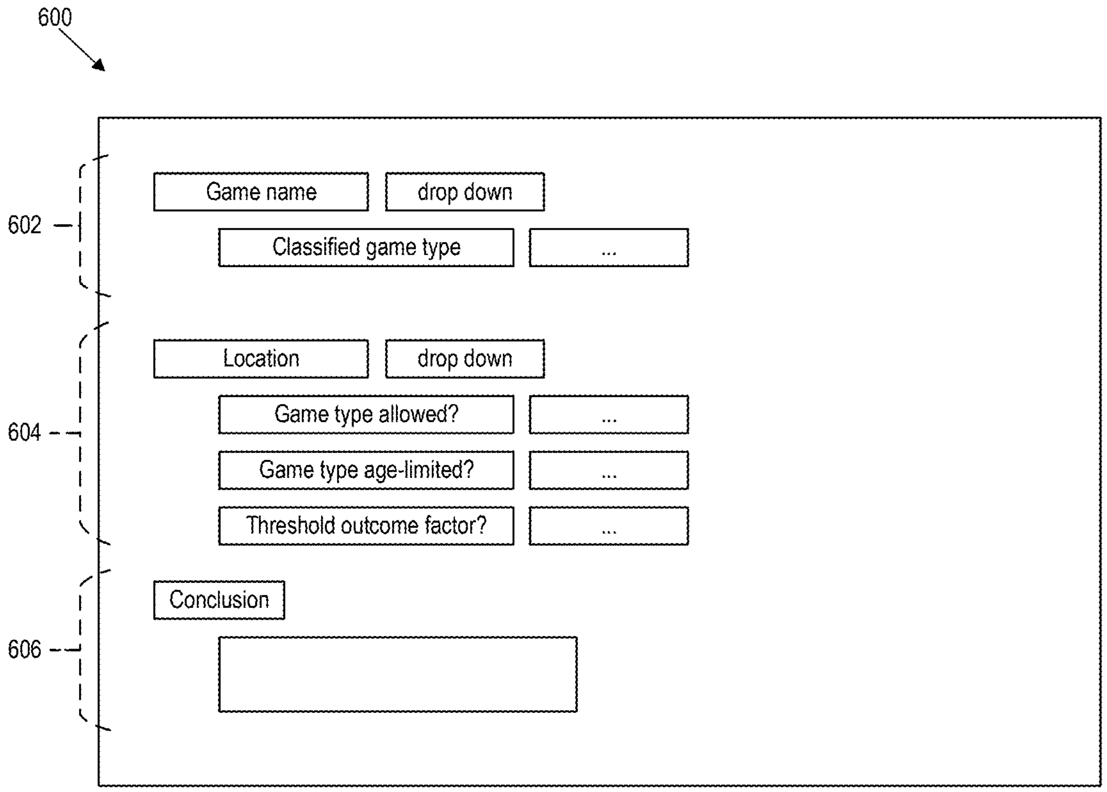
FIG. 6 illustrates an example of a client user interface via which users can request and obtain game classification information.

FIG. 6 illustrates an example of a client user interface 600 in accordance with embodiments of the present disclosure. The client user interface 600 may be provided at the client device 550 to enable a user of the client device 550 to interact with the game classification platform 500. In particular, the user of the client device 550 can, via the client user interface 600, query the game classification platform 500 and obtain game type information in addition to location-specific operational constraint information from the game classification platform 500.

In a classification portion 602 of the illustrated client user interface 600, a user can select a game from the game name drop-down menu. In response to the user's selection, the client user interface 600 provides the game type indicated for the game by the game classification platform 500. For example, in response to the user's selection, the client device 550 transmits a query to the game classification platform 500 that identifies the selected game, and the client device 550 receives the game type for the selected game for display in the client user interface 600. In some embodiments, the client user interface 600 displays a chance-versus-skill degree for the game, or the value of the particular quantile that is compared against the threshold parameters of the game classification model. For example, if the user selected the bingo game described in the previous illustrative example, the client user interface 600 may indicate 0.1821 in addition to, or alternative to, the classification of mixed skill-based game type.

In a location-specific operation portion 604 of the illustrated client user interface 600, a user can also select a location or a region of interest to obtain information regarding operation constraints on certain game types in the selected location or region. In some examples, the client user interface 600 is configured to allow users to select countries, states, counties, jurisdictions, and/or the like, and the client user interface 600 provides information such as whether a certain game type is allowed. In some embodiments, the information provided in the location-specific operation portion 604 relates to the information provided in the classification portion 602. For example, the client user interface 600 automatically populates the location-specific operation portion 604 with information regarding whether the classified game type indicated in the classification portion 602 is allowed in the selected location or region in the location-specific operation portion 604. The client user interface 600 provides further information including whether real-money play or wagering on games is allowed, whether certain game types are age-limited (and if so, the minimum age requirements associated therewith), and minimum chance-versus-skill degree required for game operation.

In a conclusion portion 606, the client user interface 600 outputs conclusions and recommendations based on respective information provided in the classification portion 602 and the location-specific operation portion 604. For example, the conclusion portion 606 indicates a determination of whether a selected game is allowed or not in the selected location or region. In some examples, if the selected game is not allowed in the selected location, the conclusion portion 606 provides recommendations for game operation, such as modification of certain game rules of the selected game to particularly manipulate the degree of chance-versus-skill in the game. Other example information provided in the conclusion portion 606 can be holistic, for example, by recommending other non-selected locations or regions that would allow the selected game. In some embodiments, the client user interface 600 obtains real-time demographic information for a game platform in communication with the game classification platform 500; accordingly, the client user interface 600 can indicate, in the conclusion portion 606, that the game platform currently has a particular number of users in the selected location/region, a particular number of users below the minimum age requirement for the selected location/region, a particular number of users that typically wager in other games provided by the game platform, and/or the like.

Thus, embodiments disclosed here can increase information dimensionality. When there are accurate information sources (e.g., with respect to location-specific operation constraints, with respect to real-time demographic or user information), information is continuously updated. Game data can also be continuously supplemented to provide identification support of game type classification for more games.

Figure 7:
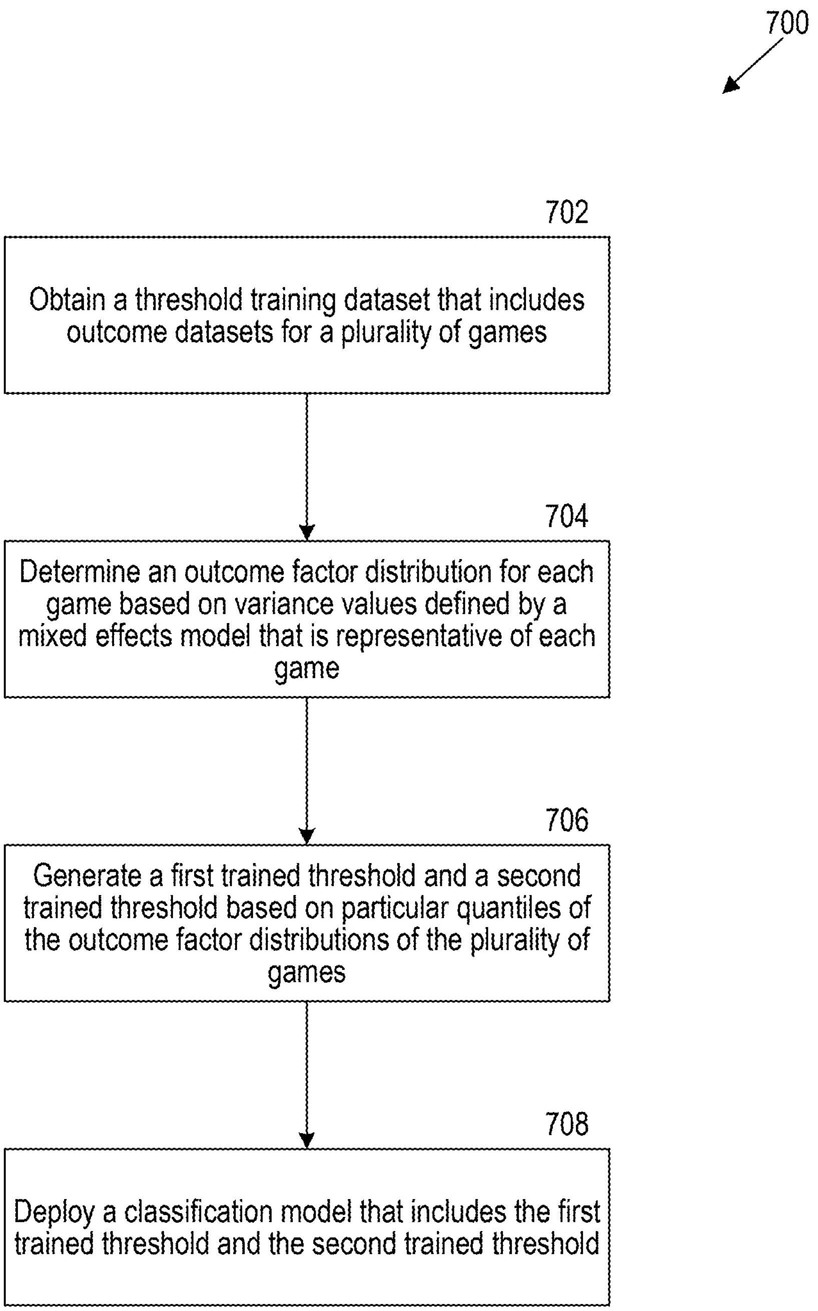
FIG. 7 is a flow diagram that illustrates example operations for providing a game classification platform.

FIG. 7 is a block diagram that describes an example process 700 for providing a game classification model. In some embodiments, the game classification platform performs the example process 700 to obtain a classification model that the game classification platform uses to provide game classification services to client devices.

At block 702, the platform obtains a threshold training dataset that includes a plurality of outcome datasets for each game of a plurality of games. Each outcome dataset includes historical outcomes by historical players of a respective game, and the plurality of games includes a first subset of games that are labelled as an absolute chance-based game and a second subset of games that are labelled as an absolute skill-based game. In some embodiments, the plurality of outcome datasets for each game include different seeds that each encode a different deterministic in-game setup or environment.

At block 704, the platform determines, from the threshold training dataset, an outcome factor distribution for each game of the plurality of games. The outcome factor distribution for a given game includes outcome factors based on variance values defined by a mixed effects model that is representative of the given game and determined from the outcome datasets of the given game. In some embodiments, the platform generates the mixed effects model for each game of the plurality of games. The mixed effects model includes a player component and a game seed component, and both the player component and the game seed component are configured as random effects in the model. In some embodiments, the variance values include a first random effect variance related to a player component of the mixed effects model and a second random effect variance related to a random error component of the mixed effects model.

At block 706, the platform generates a first trained threshold corresponding to the first subset of games and a second trained threshold corresponding to the second subset of games. The first trained threshold is based on a first particular quantile of the outcome factor distributions for the first subset of games, and a second trained threshold being based on a second particular quantile of the outcome factor distributions for the second subset of games. In some embodiments, the first particular quantile for generating the first trained threshold and the second particular quantile for generating the second trained threshold are predefined. For example, the first particular quantile is the 95% quantile, and the second particular quantile is the 5% quantile. In some embodiments, the first trained threshold is or is based on an average of the first particular quantile of each outcome factor distribution for the first subset of games, and the second trained threshold is or is based on an average of the second particular quantile of each outcome factor distribution for the second subset of games.

At block 708, the platform deploys a classification model that includes the first trained threshold and the second trained threshold. The classification model is configured to evaluate a particular game indicated in a query received from a client device with respect to the first trained threshold and the second trained threshold to classify the particular game with a particular game type. For example, the particular game is one of the plurality of games, and the platform determines whether the particular game is one of the first subset of absolute chance-based games or the second subset of absolute skill-based games. As another example, an outcome factor distribution is determined for the particular game, and a quantile of the outcome factor distribution is compared to the first trained threshold and the second trained threshold. In some embodiments, the particular game type is one of an absolute chance-based type, an absolute skill-based type, and one or more mixed types. In some embodiments, the classification model further includes one or more pre-defined thresholds that define a mixed degree of chance/skill.

In some embodiments, the platform receives the query from the client device. The query indicates the particular game that is different from the plurality of games. The platform executes the classification model to classify the particular game with the particular game type based on at least the first trained threshold and the second trained threshold. The platform causes the particular game type to be indicated via a client user interface displayed at the client device.

In some embodiments, the platform stores location-specific game operation information for a plurality of locations. The location-specific game operation information describes operation constraints for different game types. For example, the operation constraints include real money wagering being allowed or not, real money wagering amounts or bet limits, and/or the like. The platform transmits, in response to the query received from the client device, an indication of the particular game type and particular operation constraints associated with the particular game type and specific to a location associated with the client device.

Figure 8:
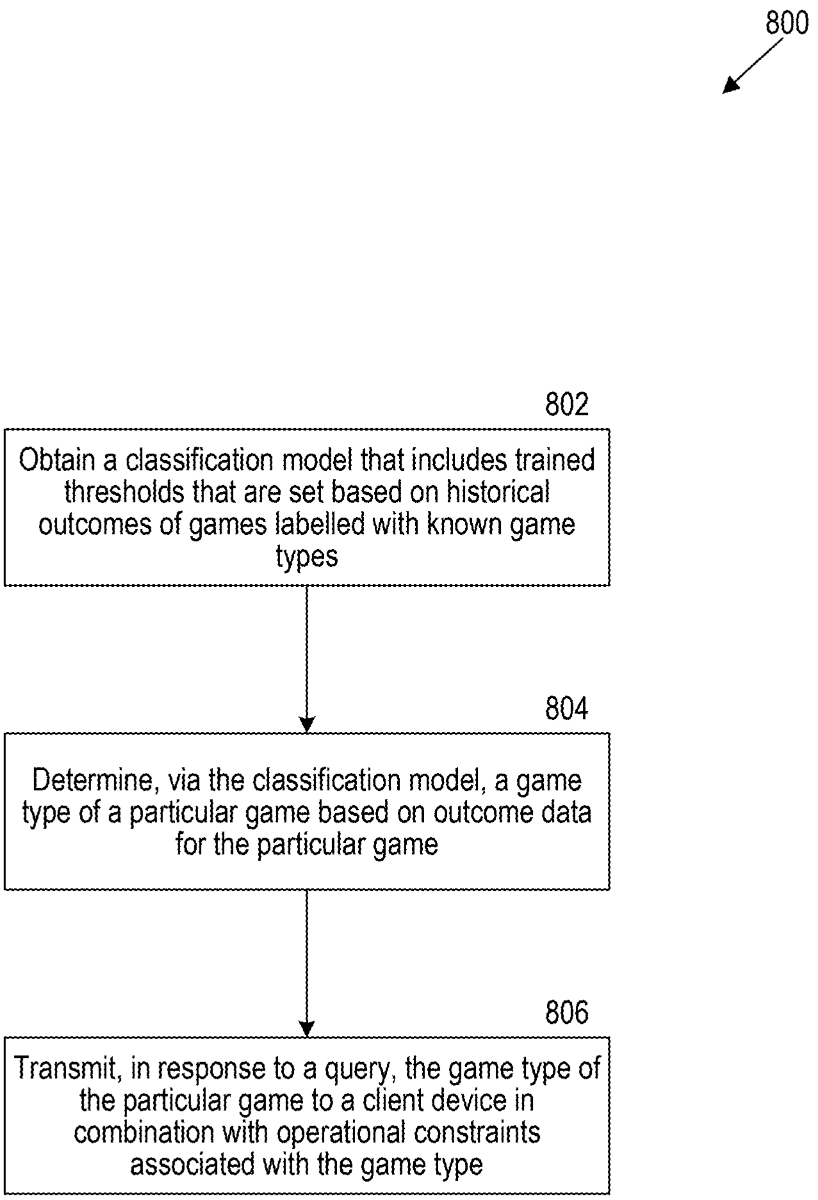
FIG. 8 is a flow diagram that illustrates example operations of a game classification process provided by a game classification platform.

FIG. 8 is a flow diagram that describes an example process 800 for providing game classification information to client devices. In some embodiments, the game classification platform performs the example process 800 to provide game classifications to client devices.

At block 802, the platform obtains a classification model that includes one or more trained thresholds that are set based on historical outcomes of a set of games that are labelled with known game types. For example, the platform receives the classification model from an external data source. In another example, the platform generates or trains the classification model. In yet another example, the platform connects to a computing system that implements the classification model. In some embodiments, the model further includes one or more pre-defined thresholds that define mixed game types.

At block 804, the platform determines, via the classification model, a game type of a particular game based on outcome data of the particular game. The game type is one of a plurality of game types that each represent a different degree of chance or skill incorporated by a given game. In some embodiments, the outcome data include outcomes that result from different seeds of the game. In some embodiments, the outcome data of the particular game is generated based on simulating the particular game with a plurality of seeds that each encode a different deterministic in-game setup or environment.

At block 806, the platform transmits, in response to a query that indicates the particular game, the determined game type to a client device in combination with operation constraints associated with the determined game type. In some embodiments, the query is received from the client device, and the operation constraints are specific to a location at which the client device is located. In some embodiments, the platform detects the query via a client user interface displayed at the client device. The client user interface is configured to enable selection of a plurality of games having determined game types, including the particular game.

In some embodiments, the game type of the particular game is determined in response to the query.

In some embodiments, determining the game type of the particular game includes determining an outcome factor distribution that includes a plurality of outcome factors based on different subsets of the outcome data, identifying a particular quantile of the outcome factor distribution, and determining the game type based on comparing the particular quantile with the one or more trained thresholds of the classification model.

In some embodiments, determining the game type of the particular game includes generating a mixed effects model that is representative of the particular game. The mixed effects model includes (i) a player component, (ii) a game seed component, and (iii) a random error component, and each of the player component, the game seed component, and the random error component is configured as a random effect in the model. The game type is then determined based on one or more outcome factors for the particular game that are based on variance values of the player component and the random error component.

Figure 9:
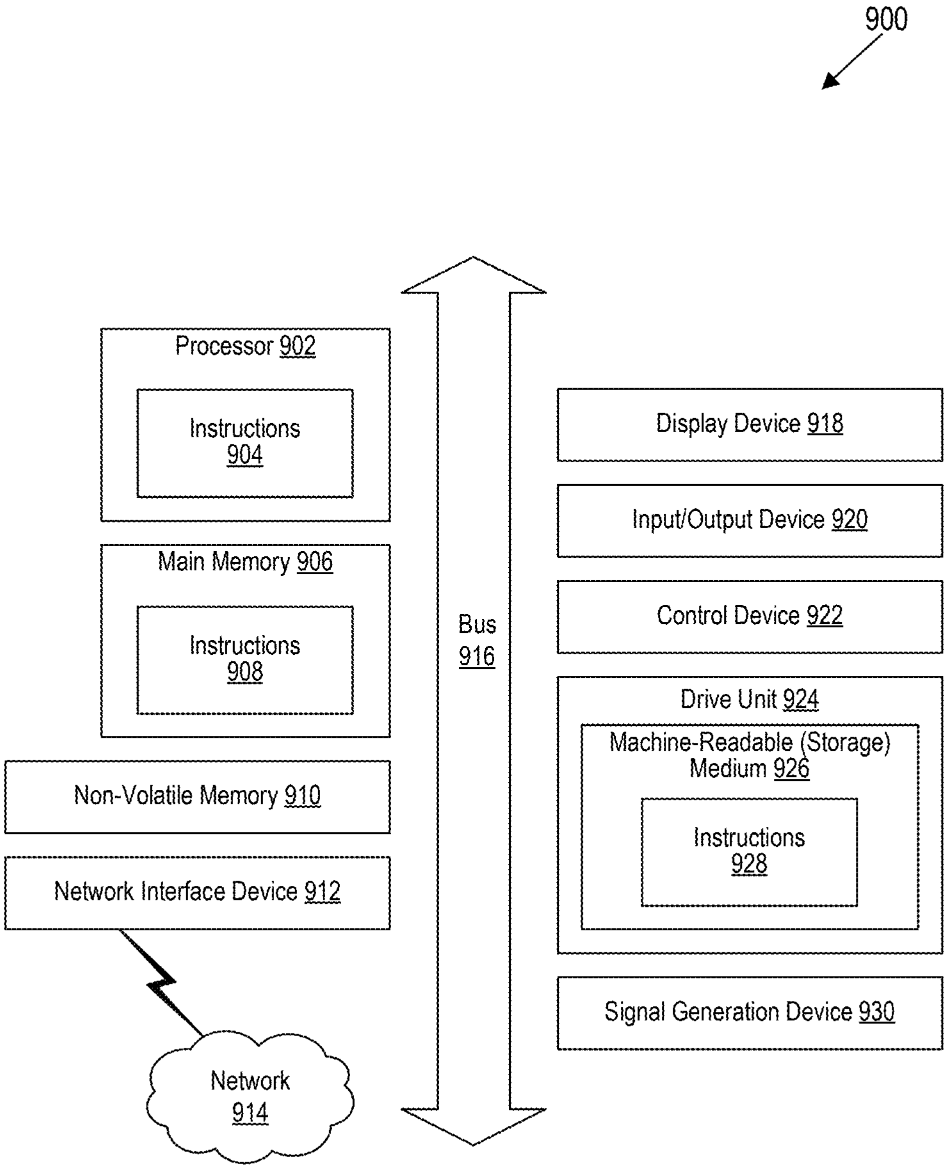
FIG. 9 is a block diagram that illustrates an example of a computer system in which at least some operations described herein can be implemented.

FIG. 9 is a block diagram that illustrates an example of a computer system 900 in which at least some embodiments described herein can be implemented. For example, the computer system 900 is implemented by the game classification platform (e.g., game classification platform 500 in FIG. 5). For example, the computer system 900 is one or more computing devices that implement the game classification platform.

As shown, the computer system 900 can include: one or more processors 902, main memory 906, non-volatile memory 910, a network interface device 912, video display device 918, an input/output device 920, a control device 922 (e.g., keyboard and pointing device), a drive unit 924 that includes a storage medium 926, and a signal generation device 930 that are communicatively connected to a bus 916. The bus 916 represents one or more physical buses and/or point-to-point connections that are connected by appropriate bridges, adapters, or controllers. Various common components (e.g., cache memory) are omitted from FIG. 9 for brevity. Instead, the computer system 900 is intended to illustrate a hardware device on which components illustrated or described relative to the examples of the figures and any other components described in this specification can be implemented.

The computer system 900 can take any suitable physical form. For example, the computing system 900 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 900. In some implementation, the computer system 900 can be an embedded computer system, a system-on-chip (SOC), a single-board computer system (SBC) or a distributed system such as a mesh of computer systems or include one or more cloud components in one or more networks. Where appropriate, one or more computer systems 900 can perform operations in real-time, near real-time, or in batch mode.

The network interface device 912 enables the computing system 900 to mediate data in the network 914 with an entity that is external to the computing system 900 through any communication protocol supported by the computing system 900 and the external entity. Examples of the network interface device 912 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 906, non-volatile memory 910, machine-readable medium 926) can be local, remote, or distributed. Although shown as a single medium, the machine-readable medium 926 can include multiple media (e.g., a centralized/distributed database and/or associated caches and servers) that store one or more sets of instructions 928. The machine-readable (storage) medium 926 can include any medium that is capable of storing, encoding, or carrying a set of instructions for execution by the computing system 900. The machine-readable medium 926 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Various embodiments of the present disclosure are listed in the following examples:

Example 1 includes a game classification platform implemented by one or more computing servers, the one or more computing servers comprising at least one processor and at least one memory storing instructions that, when executed by the at least one processor, cause the game classification platform to: obtain a threshold training dataset that includes a plurality of outcome datasets for each game of a plurality of games, wherein each outcome dataset includes historical outcomes by historical players of a respective game, and wherein the plurality of games includes a first subset of games that are labelled as an absolute chance-based game and a second subset of games that are labelled as an absolute skill-based game; determine, from the threshold training dataset, an outcome factor distribution for each game of the plurality of games, the outcome factor distribution for a given game including outcome factors based on variance values defined by a mixed effects model that is representative of the given game and determined from the outcome datasets of the given game; generate a first trained threshold corresponding to the first subset of games and a second trained threshold corresponding to the second subset of games, the first trained threshold being based on a first particular quantile of the outcome factor distributions for the first subset of games, and a second trained threshold being based on a second particular quantile of the outcome factor distributions for the second subset of games; and deploy a classification model that includes the first trained threshold and the second trained threshold, wherein the classification model is configured to evaluate a particular game indicated in a query received from a client device with respect to the first trained threshold and the second trained threshold to classify the particular game with a particular game type.

Example 2 includes the game classification platform of example 1, wherein the variance values include a first random effect variance related to a player component of the mixed effects model and a second random effect variance related to a random error component of the mixed effects model.

Example 3 includes the game classification platform of any of examples 1-2, wherein the instructions further cause the game classification platform to: generate the mixed effects model for each game of the plurality of games, wherein the mixed effects model includes a player component and a game seed component, and wherein both the player component and the game seed component are configured as random effects in the model.

Example 4 includes the game classification platform of any of examples 1-3, wherein the classification model further includes one or more pre-defined thresholds that define a mixed degree of chance/skill, and wherein the particular game type is one of an absolute chance-based type, an absolute skill-based type, and one or more mixed types.

Example 5 includes the game classification platform of any of examples 1-4, wherein the first particular quantile for generating the first trained threshold and the second particular quantile for generating the second trained threshold are predefined.

Example 6 includes the game classification platform of any of examples 1-5, wherein the instructions further cause the game classification platform to: receive the query from the client device, the query indicating the particular game that is different from the plurality of games; execute the classification model to classify the particular game with the particular game type based on at least the first trained threshold and the second trained threshold; and cause the particular game type to be indicated via a client user interface displayed at the client device.

Example 7 includes the game classification platform of any of examples 1-6, wherein the instructions further cause the game classification platform to: store location-specific game operation information for a plurality of locations, the location-specific game operation information describing operation constraints for different game types; and in response to the query received from the client device, transmit an indication of the particular game type and particular operation constraints associated with the particular game type and specific to a location associated with the client device.

Example 8 includes the game classification platform of any of examples 1-7, wherein the plurality of outcome datasets for each game include different seeds that each encode a different deterministic in-game setup or environment.

Example 9 includes a method for providing game classification for a computer service platform, the method comprising: obtaining a training dataset that describes historical outcomes by historical players for each game of a plurality of games, wherein the plurality of games includes a first subset of games that are labelled as an absolute chance-based game and a second subset of games that are labelled as an absolute skill-based game; determining, from the training dataset, an outcome factor distribution for each game of the plurality of games, the outcome factor distribution for a given game including outcome factors based on variance values defined by a mixed effects model representative of the given game and determined from the outcome datasets of the given game; generating a first trained threshold from the outcome factor distributions of the first subset of games and a second trained threshold from the outcome factor distributions of the second subset of games; and deploying a classification model that includes the first trained threshold and the second trained threshold, wherein the classification model is configured to evaluate a particular game with respect to the first trained threshold and the second trained threshold to classify the particular game with a particular game type.

Example 10 includes the method of example 9, wherein the variance values include a first random effect variance related to a player component of the mixed effects model and a second random effect variance related to a random error component of the mixed effects model.

Examples 11 includes the method of any of examples 9-10, further comprising: generating the mixed effects model for each game of the plurality of games, wherein the mixed effects model includes a player component and a game seed component, and wherein both the player component and the game seed component are configured as random effects in the model.

Example 12 includes the method of any of examples 9-11, wherein the classification model further includes one or more pre-defined thresholds that define a mixed degree of chance/skill, and wherein the particular game type is one of an absolute chance-based type, an absolute skill-based type, and one or more mixed types.

Example 13 includes the method of any of examples 9-12, wherein the first trained threshold is generated based on a first particular quantile of the outcome factor distributions of the first subset of games, and wherein the second trained threshold is generated based on a second particular quantile of the outcome factor distributions of the second subset of games.

Example 14 includes the method of any of examples 9-13, further comprising: receiving a query from a client device, the query indicating a particular game that is different from the plurality of games; executing the classification model to classify the particular game with a particular game type based on at least the first trained threshold and the second trained threshold; and cause the particular game type to be indicated via a client user interface displayed at the client device.

Example 15 includes the method of any of examples 9-14, further comprising: storing location-specific regulation information for a plurality of locations, the location-specific regulation information describing operation constraints for different game types; and in response to a query received from a client device that indicates a particular game, transmitting an indication of a particular game type for the particular game according to the classification model and particular operation constraints associated with the particular game type and specific to a location associated with the client device.

Example 16 includes the method of any of examples 9-15, wherein the training dataset includes, for a given game, the historical outcomes for different game seeds that each encode a different deterministic in-game setup or environment for the given game.

Example 17 includes a method of standardized game classification, comprising: generating a classification model that includes one or more trained thresholds that are set based on historical outcomes of a set of games that are labelled with known game types; determining, via the classification model, a game type of a particular game based on outcome data of the particular game, wherein the game type is one of a plurality of game types that each represent a different degree of chance or skill incorporated by a given game; and in response to a query that indicates the particular game, transmitting the determined game type to a client device in combination with operation constraints associated with the determined game type.

Example 18 includes the method of example 17, wherein the query is received from the client device, and wherein the operation constraints are specific to a location at which the client device is located.

Example 19 includes the method of any of examples 17-18, further comprising: detecting the query via a client user interface displayed at the client device, wherein the client user interface is configured to enable selection of a plurality of games having determined game types, including the particular game.

Example 20 includes the method of any of examples 17-19, wherein the game type of the particular game is determined in response to the query.

Example 21 includes the method of any of examples 17-20, wherein determining the game type of the particular game comprises: determining an outcome factor distribution that includes a plurality of outcome factors based on different subsets of the outcome data; identifying a particular quantile of the outcome factor distribution; and determining the game type based on comparing the particular quantile with the one or more trained thresholds of the classification model.

Example 22 includes the method of any of examples 17-21, wherein determining the game type of the particular game comprises: generating a mixed effects model that is representative of the particular game, the mixed effects model including (i) a player component, (ii) a game seed component, and (iii) a random error component, wherein each of the player component, the game seed component, and the random error component is configured as a random effect in the model; and determining the game type based on one or more outcome factors for the particular game that are based on variance values of the player component and the random error component.

Example 23 includes the method of any of examples 17-22, wherein the outcome data include outcomes that result from different seeds of the game.

Example 24 includes the method of any of examples 17-23, wherein the model further includes one or more pre-defined thresholds that define mixed game types.

Example 25 includes the method of any of examples 17-24, wherein the outcome data of the particular game is generated based on simulating the particular game with a plurality of seeds that each encode a different deterministic in-game setup or environment Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 904, 908, 928) set at various times in various memory and storage devices in computing device(s). When read and executed by the processor 902, the instruction(s) cause the computer system 900 to perform operations to execute elements involving the various aspects of the disclosure.

VIII. Remarks

The terms "example," "embodiment," and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of present disclosure are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

In addition, techniques, systems, subsystems, and methods described and illustrated in the various embodiments as discrete or separate may be combined or integrated with other systems, modules, techniques, or methods without departing from the scope of this disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

Implementations of the subject matter and the functional operations described in this patent document can be implemented in various systems, semiconductor devices, ultrasonic devices, digital electronic circuitry, or in computer software, firmware, or hardware, including the structures disclosed in this specification and their structural equivalents, or in combinations of one or more of them. Implementations of aspects of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming languages, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

What is claimed is:

1. A game classification platform implemented by one or more computing servers, the one or more computing servers comprising at least one processor and at least one memory storing instructions that, when executed by the at least one processor, cause the game classification platform to:

obtain a threshold training dataset that includes a plurality of outcome datasets for each game of a plurality of games, wherein each outcome dataset includes historical outcomes by historical players of a respective game, and wherein the plurality of games includes a first subset of games that are labelled as an absolute chance-based game and a second subset of games that are labelled as an absolute skill-based game;

determine, from the threshold training dataset, an outcome factor distribution for each game of the plurality of games, the outcome factor distribution for a given game including outcome factors based on variance values defined by a mixed effects model that is representative of the given game and determined from the outcome datasets of the given game;

generate a first trained threshold corresponding to the first subset of games and a second trained threshold corresponding to the second subset of games, the first trained threshold being based on a first particular quantile of the outcome factor distributions for the first subset of games, and a second trained threshold being based on a second particular quantile of the outcome factor distributions for the second subset of games wherein the first particular quantile for generating the first trained threshold and the second particular quantile for generating the second trained threshold are predefined; and deploy a classification model that includes the first trained threshold and the second trained threshold, wherein the classification model is configured to evaluate a particular game indicated in a query received from a client device with respect to the first trained threshold and the second trained threshold to classify the particular game with a particular game type.

2. The game classification platform of claim 1, wherein the variance values include a first random effect variance related to a player component of the mixed effects model and a second random effect variance related to a random error component of the mixed effects model.

3. The game classification platform of claim 1, wherein the instructions further cause the game classification platform to:

generate the mixed effects model for each game of the plurality of games, wherein the mixed effects model includes a player component and a game seed component, and wherein both the player component and the game seed component are configured as random effects in the model.

4. The game classification platform of claim 1, wherein the classification model further includes one or more pre-defined thresholds that define a mixed degree of chance/skill, and wherein the particular game type is one of an absolute chance-based type, an absolute skill-based type, and one or more mixed types.

5. The game classification platform of claim 1, wherein the instructions further cause the game classification platform to:

receive the query from the client device, the query indicating the particular game that is different from the plurality of games;

execute the classification model to classify the particular game with the particular game type based on at least the first trained threshold and the second trained threshold; and cause the particular game type to be indicated via a client user interface displayed at the client device.

6. The game classification platform of claim 1, wherein the instructions further cause the game classification platform to:

store location-specific game operation information for a plurality of locations, the location-specific game operation information describing operation constraints for different game types; and in response to the query received from the client device, transmit an indication of the particular game type and particular operation constraints associated with the particular game type and specific to a location associated with the client device.

7. The game classification platform of claim 1, wherein the plurality of outcome datasets for each game include different seeds that each encode a different deterministic in-game setup or environment.

8. A method for providing game classification for a computer service platform, the method comprising:

obtaining a training dataset that describes historical outcomes by historical players for each game of a plurality of games, wherein the plurality of games includes a first subset of games that are labelled as an absolute chance-based game and a second subset of games that are labelled as an absolute skill-based game;

determining, from the training dataset, an outcome factor distribution for each game of the plurality of games, the outcome factor distribution for a given game including outcome factors based on variance values defined by a mixed effects model representative of the given game and determined from the outcome datasets of the given game;

generating a first trained threshold from the outcome factor distributions of the first subset of games and a second trained threshold from the outcome factor distributions of the second subset of games, the first trained threshold being based on a first particular quantile of the outcome factor distributions for the first subset of games, and a second trained threshold being based on a second particular quantile of the outcome factor distributions for the second subset of games wherein the first particular quantile for generating the first trained threshold and the second particular quantile for generating the second trained threshold are predefined; and deploying a classification model that includes the first trained threshold and the second trained threshold, wherein the classification model is configured to evaluate a particular game with respect to the first trained threshold and the second trained threshold to classify the particular game with a particular game type.

9. The method of claim 8, wherein the variance values include a first random effect variance related to a player component of the mixed effects model and a second random effect variance related to a random error component of the mixed effects model.

10. The method of claim 8, further comprising:

generating the mixed effects model for each game of the plurality of games, wherein the mixed effects model includes a player component and a game seed component, and wherein both the player component and the game seed component are configured as random effects in the model.

11. The method of claim 8, wherein the classification model further includes one or more pre-defined thresholds that define a mixed degree of chance/skill, and wherein the particular game type is one of an absolute chance-based type, an absolute skill-based type, and one or more mixed types.

12. The method of claim 8, wherein the first trained threshold is generated based on a first particular quantile of the outcome factor distributions of the first subset of games, and wherein the second trained threshold is generated based on a second particular quantile of the outcome factor distributions of the second subset of games.

13. The method of claim 8, further comprising:

receiving a query from a client device, the query indicating a particular game that is different from the plurality of games;

executing the classification model to classify the particular game with a particular game type based on at least the first trained threshold and the second trained threshold; and cause the particular game type to be indicated via a client user interface displayed at the client device.

14. The method of claim 8, further comprising:

storing location-specific regulation information for a plurality of locations, the location-specific regulation information describing operation constraints for different game types; and in response to a query received from a client device that indicates a particular game, transmitting an indication of a particular game type for the particular game according to the classification model and particular operation constraints associated with the particular game type and specific to a location associated with the client device.

15. The method of claim 8, wherein the training dataset includes, for a given game, the historical outcomes for different game seeds that each encode a different deterministic in-game setup or environment for the given game.

16. A method of standardized game classification, comprising:

generating a classification model that includes one or more trained thresholds that are set based on historical outcomes of a set of games that are labelled with known game types;

store location-specific game operation information for a plurality of locations, the location-specific game operation information describing operation constraints for different game types;

determining, via the classification model, a game type of a particular game based on outcome data of the particular game, wherein the game type is one of a plurality of game types that each represent a different degree of chance or skill incorporated by a given game;

determining operation constraints associated with the determined game type based on location-specific game operation information for the determined game type; and in response to a query that indicates the particular game, transmitting the determined game type to a client device in combination with the operation constraints associated with the determined game type and specific to a location associated with the client device.

17. The method of claim 16, wherein the query is received from the client device, and wherein the operation constraints are specific to a location at which the client device is located.

18. The method of claim 16, further comprising:

detecting the query via a client user interface displayed at the client device, wherein the client user interface is configured to enable selection of a plurality of games having determined game types, including the particular game.

19. The method of claim 16, wherein the game type of the particular game is determined in response to the query.

20. The method of claim 16, wherein determining the game type of the particular game comprises:

determining an outcome factor distribution that includes a plurality of outcome factors based on different subsets of the outcome data;

identifying a particular quantile of the outcome factor distribution; and determining the game type based on comparing the particular quantile with the one or more trained thresholds of the classification model.

21. The method of claim 16, wherein determining the game type of the particular game comprises:

generating a mixed effects model that is representative of the particular game, the mixed effects model including (i) a player component, (ii) a game seed component, and (iii) a random error component, wherein each of the player component, the game seed component, and the random error component is configured as a random effect in the model; and determining the game type based on one or more outcome factors for the particular game that are based on variance values of the player component and the random error component.

22. The method of claim 16, wherein the outcome data include outcomes that result from different seeds of the game.

23. The method of claim 16, wherein the model further includes one or more pre-defined thresholds that define mixed game types.

24. The method of claim 16, wherein the outcome data of the particular game is generated based on simulating the particular game with a plurality of seeds that each encode a different deterministic in-game setup or environment.

* * * * *